United States Patent
Lee et al.

(10) Patent No.: US 11,522,580 B2
(45) Date of Patent: Dec. 6, 2022

(54) NEAR FIELD COMMUNICATION DEVICE AND TAG POSITION DETERMINATION METHOD BY USING THE SAME

(71) Applicant: ASUSTeK COMPUTER INC., Taipei (TW)

(72) Inventors: An-Yao Lee, Taipei (TW); Szu-Lung Yen, Taipei (TW); Cheng-Yu Wang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/137,553

(22) Filed: Dec. 30, 2020

(65) Prior Publication Data

US 2021/0218439 A1 Jul. 15, 2021

(30) Foreign Application Priority Data

Jan. 9, 2020 (TW) .................................. 109100804

(51) Int. Cl.
| | |
|---|---|
| *H04B 5/00* | (2006.01) |
| *G06K 19/07* | (2006.01) |
| *H04W 4/80* | (2018.01) |
| *H01Q 7/00* | (2006.01) |

(52) U.S. Cl.
CPC ....... *H04B 5/0081* (2013.01); *G06K 19/0723* (2013.01); *H01Q 7/00* (2013.01); *H04W 4/80* (2018.02)

(58) Field of Classification Search
CPC .... G06K 19/0723; H01Q 7/00; H04B 5/0081; H04W 4/80
See application file for complete search history.

(56) References Cited

U.S. PATENT DOCUMENTS

| | | | |
|---|---|---|---|
| 7,541,930 B2 * | 6/2009 | Saarisalo | G06K 7/0008 340/10.1 |
| 9,306,626 B2 | 4/2016 | Brand et al. | |
| 11,012,119 B2 | 5/2021 | Liu et al. | |

(Continued)

FOREIGN PATENT DOCUMENTS

| | | |
|---|---|---|
| CN | 101645129 A | 2/2010 |
| CN | 105704814 A | 6/2016 |

(Continued)

*Primary Examiner* — David Bilodeau
(74) *Attorney, Agent, or Firm* — McClure, Qualey & Rodack, LLP (57) ABSTRACT

A near field communication device and a method of determining the position of a tag are provided. The near field communication device includes a first coil, a second coil, and a control circuit. One end of the first coil is coupled to a first grounding end. One end of the second coil is coupled to a second grounding end. The control circuit includes a first current pin and a second current pin. The first current pin is coupled to the other end of the first coil. The second current pin is coupled to the other end of the second coil. The control circuit transmits a first current signal to the first coil by the first current pin, and transmits a second current signal to the second coil by the second current pin, the control circuit analyzes the change of the first current signal and the change of the second current signal to determine whether the position of a tag is close to the first coil or close to the second coil.

10 Claims, 5 Drawing Sheets

(56) References Cited

U.S. PATENT DOCUMENTS

| | | | | |
|---|---|---|---|---|
| 2008/0090519 A1* | 4/2008 | Rofougaran | ......... | H04B 5/0075 |
| | | | | 455/41.1 |
| 2013/0309964 A1* | 11/2013 | Hall | ......... | H04B 5/00 |
| | | | | 455/41.1 |
| 2016/0174266 A1* | 6/2016 | Goel | ......... | H04W 4/70 |
| | | | | 455/509 |
| 2019/0370508 A1* | 12/2019 | Antonetti | ......... | G06K 7/10297 |
| 2020/0235787 A1* | 7/2020 | Wurmfeld | ......... | H04B 5/0087 |
| 2020/0252106 A1* | 8/2020 | Wurmfeld | ......... | H04B 17/336 |

FOREIGN PATENT DOCUMENTS

| | | |
|---|---|---|
| CN | 108701890 A | 10/2018 |
| TW | 201349778 A | 12/2013 |
| TW | 201906334 A | 2/2019 |

\* cited by examiner

NEAR FIELD COMMUNICATION DEVICE AND TAG POSITION DETERMINATION METHOD BY USING THE SAME

CROSS-REFERENCE TO RELATED APPLICATION

This application claims the priority benefit of Taiwan applications serial No. 109100804, filed on Jan. 9, 2020. The entirety of the above-mentioned patent application is hereby incorporated by reference herein and made a part of specification.

BACKGROUND OF THE INVENTION

Field of the Invention

The invention relates to a near field communication device and, more particularly, to a tag position determination method by using the same.

Description of the Related Art

Near Field Communication (NFC) is a new type of standardized short-range wireless communication technology. The magnetic field induction enables the electronic device to realize interconnection and communication at a close distance. Currently, a non-contact coupling device only includes single induction coil. When there is size difference between the induction coil in the non-contact coupling device and the induction coil in the non-contact integrated circuit card, insufficient magnetic flux at the center of the induction coil in a non-contact coupling device is unable for a non-contact integrated circuit card to be inductive, which results a narrow sensing area. Furthermore, it is also restrict by concerning the size of the induction coil in a non-contact integrated circuit card while designing the size of the induction coil in a non-contact coupling device.

BRIEF SUMMARY OF THE INVENTION

According to the first aspect, a near field communication device is disclosed. The near field communication device includes a first coil, a second coil, and a control circuit. The near field communication device includes a first coil, a second coil, and a control circuit. One end of the first coil is coupled to a first grounding end. One end of the second coil is coupled to a second grounding end. The control circuit includes a first current pin and a second current pin. The first current pin is coupled to the other end of the first coil. The second current pin is coupled to the other end of the second coil. The control circuit transmits a first current signal to the first coil by the first current pin, and transmits a second current signal to the second coil by the second current pin, the control circuit analyzes the change of the first current signal and the change of the second current signal to determine whether the position of a tag is close to the first coil or close to the second coil.

According to the second aspect, a near field communication device is provided. The near field communication device includes a plurality of first coils, a plurality of second coils, a first selection circuit, a second selection circuit, and a control circuit. One end of each of the first coils is couple to the grounding end. One end of each of the second coils is couple to the grounding end. The first selection circuit is coupled to the other end of each of the first coils. The second selection circuit is coupled to the other end of each of the second coils. The control circuit includes a first current pin and a second current pin. The first current pin is coupled to the first selection circuit. The second current pin, coupled to the second selection circuit. The control circuit controls the first selection circuit to electrically connect with the first coils respectively, and transmits a first current signal to one of the first coils by the first current pin and the first selection circuit, the control circuit controls the second selection circuit to electrically connect with the second coils respectively, and transmits a second current signal to one of the second coils via the second current pin and the second selection circuit, and the control circuit analyzes change of the first current signal and change of the second current signal to determine whether the position of a tag is close to one of the first coils or close to one of the second coils.

According to the third aspect, a method of determining the position of a tag is provided. The method includes following steps: transmitting a first current signal to a first coil by a first current pin of a control circuit at a first time point; analyzing the change of the first current signal to determine whether the position of a tag is close to the first coil by the control circuit; transmitting a second current signal to a second coil by a second current pin of the control circuit at a second time point; and analyzing the change of the second current signal to determine whether the position of the tag is close to the second coil by the control circuit.

DETAILED DESCRIPTION OF THE EMBODIMENTS

Figure 1:
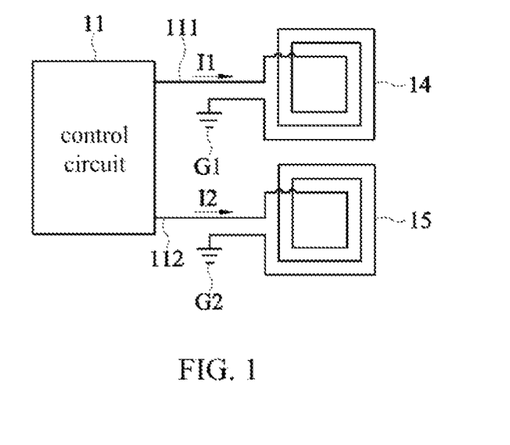
FIG. 1 is a schematic diagram showing a near field communication device according to a first embodiment.

FIG. 1 is a schematic diagram showing a near field communication (NFC) device according to a first embodiment. The near field communication device is a reader configured to determine the position of a tag. The near field communication device includes a control circuit 11 and two coils 14, 15 coupled to the control circuit 11 (hereinafter referred to as the first coil 14 and the second coil 15 respectively). The control circuit 11 includes two current pins 111, 112 (hereinafter referred to as the first current pin 111 and the second current pin 112, respectively). The first coil 14 and the second coil 15 respectively include two ends. One end of the first coil 14 is connected to a grounding end G (hereinafter referred to as the first grounding end G1), and the other end of the first coil 14 is connected to the first current pin 111. One end of the second coil 15 is connected to a grounding end G2 (hereinafter referred to as the second grounding end G2), and the other end of the second coil 15 is connected to the second current pin 112.

The control circuit 11 transmits a current signal I1 (hereinafter referred to as the first current signal I1) to the first coil 14 via the first current pin 111, and the control circuit 11 transmits the current signal I2 (hereinafter referred to as the second current signal I2) to the second coil 15 via the second current pin 112. The control circuit 11 determines whether the tag is close to the first coil 14 by the change of the first current signal I1 (the distance between the tag and the first coil 14 is in a detectable range). And the control circuit 11 determines whether the tag is close to the second coil 15 by the change of the second current signal I2 (the distance between the tag and the second coil 15 is in a detectable distance). That is, the control circuit 11 determines whether the tag is close to the first coil 14 or close to the second coil 15.

Figure 2:
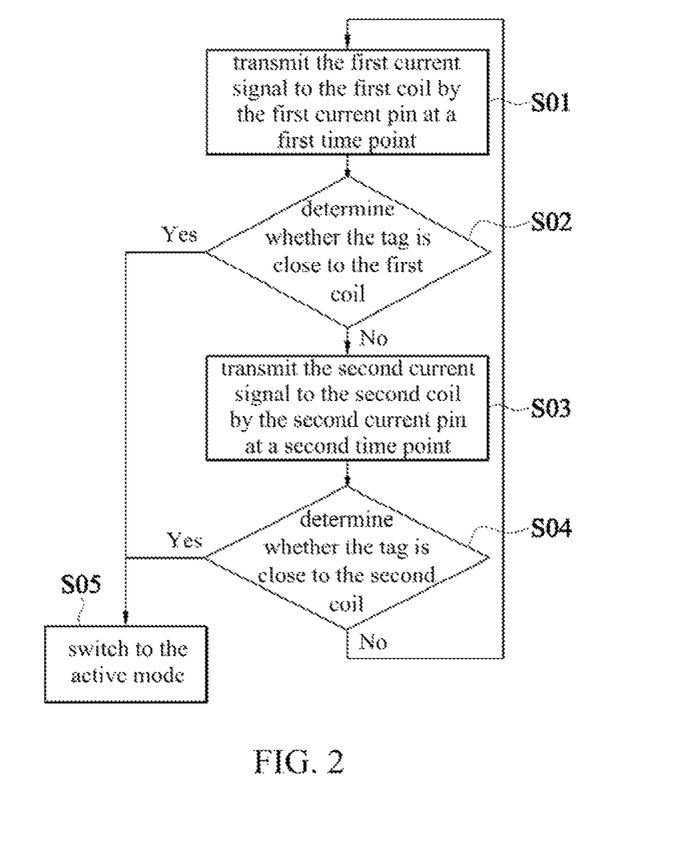
FIG. 2 is a flow chart showing a method of determining the position of a tag using a near field communication technology according to a first embodiment.

Please refer to FIG. 1 and FIG. 2 together. FIG. 2 is a flow chart showing a method of determining the position of a tag using a near field communication technology according to a first embodiment. When determining the position of the tag, the control circuit 11 transmits the first current signal I1 to the first coil 14 by the first current pin 111 at a first time point (step S01). When the first current signal I1 is transmitted to the first coil 14, a magnetic field is generated around the first coil 14. At this time, when the tag is close to the first coil 14, the magnetic field of the first coil 14 changes the current value of the first current signal I1 in response to the coil in the tag. The control circuit 11 analyzes the change of the current value of the first current signal I1 to determine whether the tag is close to the first coil 14 (step S02). When the position of the tag is not close to the first coil 14 (the determination result is "No"), the control circuit 11 transmits the second current signal I2 to the second coil 15 by the second current pin 112 at a second time point later than the first time point (step S03). In step S03, the control circuit 11 does not transmit the first current signal I1 by the first current pin 111. When the second current signal I2 is transmitted to the second coil 15, a magnetic field is generated around the second coil 15. When the tag is close to the second coil 15, the second coil 15 changes the current value of the second current signal I2 in response to the coil in the tag, and the control circuit I1 analyzes the change in the current value of the second current signal I2 to determine whether the tag is close to the second coil 15 (step S04).

When the change of the current value of the first current signal I1 is greater than a preset value, the control circuit 11 determines that the tag is close to the first coil 14 (the determination result is "Yes") in step S02. When the change of the current value of the second current signal I2 is greater than the preset value, the control circuit 11 determines that the tag is close to the second coil 15 in step S04 (the determination result is "Yes"). Accordingly, the plurality of the coils in this disclosure are configured to detect the tag, and the sensing area of the near field communication device is enlarged, therefore, the accuracy and precision for detecting the tag position is also improved. Furthermore, the near field communication device does not require additional infrared or other positioning technology to detect the position of the tag, which saves costs.

In one embodiment, the first current pin 111 is a positive pin and the second current pin 112 is a negative pin.

In one embodiment, the near field communication device has a power saving operating mode and an active mode in the listening stage. The power saving operating mode composed of a duty cycle and a sleep cycle, and the control circuit 11 executes steps S01 to S04 in the duty cycle to determine whether the tag is close to the first coil 14 or the second coil 15 in the duty cycle. For example, when the control circuit 11 determines that the position of the tag is not close to the second coil 15 (the determination result is "No") in step S04, the control circuit 11 continues to determine the position of the tag until the duty cycle ends from step S01. When the duty cycle ends, the near field communication device enters the sleep cycle. In the sleep cycle, the control circuit 11 does not transmit the current signals I1, I2 by the current pins 111, 112, that is, the control circuit 11 does not determine the position of the tag in the sleep cycle, thus to save power consumption.

In an embodiment, a cycle time is 100 millisecond (ms), the duty cycle is 1 ms and the sleep cycle is 99 ms. The control circuit 11 transmits the current signals I1, I2 within the duty cycle of 1 ms, and determines whether the position of the tag is close to the first coil 14 or the second coil 15 according to the current signal I1, I2 within 1 ms. After 1 ms, the control circuit 11 enters the sleep cycle, and after 99 ms, the control circuit 11 enters the duty cycle. In one embodiment, when the control circuit 11 determines that the tag is close to the first coil 14 or the second coil 15 in the duty cycle, the near field communication device switches from the power saving operating mode to the active mode (step S05) and enters a polling stage. In an embodiment, the position of the tag is close to the second coil 15, the control circuit 11 communicates with the tag by the second coil 15 in the active mode to establish data transmission with the tag.

Figure 3:
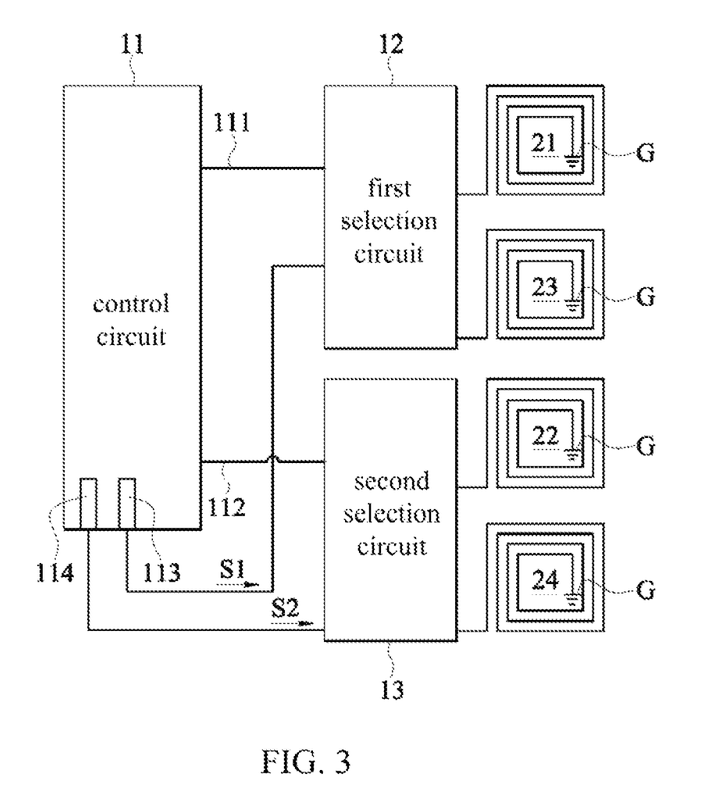
FIG. 3 is a schematic diagram showing a near field communication device according to a second embodiment.

FIG. 3 is a schematic diagram showing a near field communication device according to a second embodiment. Please refer to FIG. 3. The difference between FIG. 3 and FIG. 1 is that the near field communication device in FIG. 3 further includes two selection circuits 12, 13 (hereinafter referred to as the first selection circuit 12 and the second selection circuit 13), and the first current pin 111 is respectively coupled a plurality of coils 21, 23 (hereinafter referred to as the first coil 21 and the third coil 23 respectively) via the first selection circuit 12. The second current pin 112 is respectively coupled to the plurality of coils 22 and 24 (hereinafter referred to as the second coil 22 and the fourth coil 24) via the second selection circuit 13.

The first selection circuit 12 is coupled between the first current pin 111 and the coils 21, 23. The input end of the first selection circuit 12 is coupled to the first current pin 111, two output ends of the first selection circuit 12 are respectively coupled to one end of the coil 21 and one end of the coil 23, the other ends of the coils 21 and 23 are respectively coupled to the grounding end G, and the connection between the first selection circuit 12 and the coil 21 and that between the first selection circuit 12 and the coil 23 are independent loop circuit. The first selection circuit 12 is electrically connected to the first coil 21 and the third coil 23 in sequence. The first selection circuit 12 establishes a connection between the first current pin 111 and the first coil 21 or a connection between the first current pin 111 and the third coil 23. The second selection circuit 13 is coupled between the second current pin 112 and the coils 22, 24. The input end of the second selection circuit 13 is coupled to the second current pin 112, two output ends of the second selection circuit 13 are respectively coupled to one end of the coil 22 and one end of the coil 24, the other ends of the coils 22 and 24 are respectively coupled to the grounding end G, and the connection between the second selection circuit 13 and the coil 22 and that between the second selection circuit 13 and the coil 24 are independent loop circuit. The second selection circuit 13 is electrically connected to the second coil 22 and the fourth coil 24 in sequence, the second selection circuit 13 establishes a connection between the second current pin 112 and the second coil 22, or a connection between the second current pin 112 and the fourth coil 24.

In an embodiment, the control circuit 11 further includes two control pins 113, 114 (hereinafter referred to as the first control pin 113 and the second control pin 114), the first control pin 113 is coupled to the first selection circuit 12, and the second control pin 114 is coupled to the second selection circuit 13. The control circuit 11 transmits a control signal S1 to the first selection circuit 12 by the first control pin 113 to control the first selection circuit 12 to electrically connect the first current pin 111 to the first coil 21 or the third coil 23. The control circuit 11 also transmits a control signal S2 to the second selection circuit 13 by the second control pin 114 to control the second selection circuit 13 to electrically connect the second current pin 112 to the second coil 22 or the fourth coil 24.

When the first selection circuit 12 electrically connects the first current pin 111 to the first coil 21 or the third coil 23, the control circuit 11 transmits the current signal by the first current pin 111. The current signal flows through the first selection circuit 12 into the first coil 21 or the third coil 23, and then the control circuit 1 analyzes whether the change of the current value of the current signal on the first current pin 111 is greater than the preset value, thus to determine whether the tag is close to the first coil 21 or the third coil 23.

On the other hand, when the second selection circuit 13 electrically connects the second current pin 112 to the second coil 22 or the fourth coil 24, the control circuit 11 transmits the current signal through the second current pin 112. The current signal flows through the second selection circuit 13 into the second coil 22 or the fourth coil 24, and then the control circuit 11 analyzes whether the change of the current value of the current signal on the second current pin 112 is greater than the preset value to determine whether the position of the tag is close to the second coil 22 or the fourth coil 24.

Figure 4:
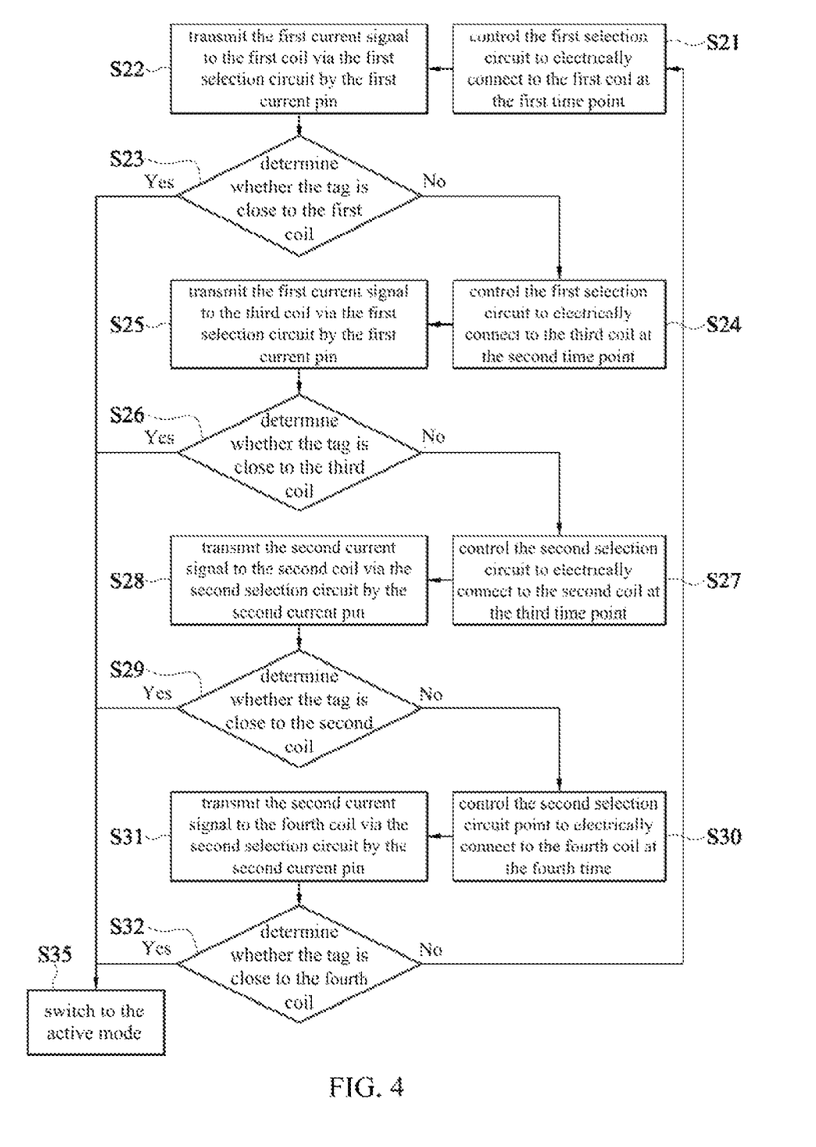
FIG. 4 is a flowchart showing a method of determining the position of a tag using a near field communication technology according to a second embodiment.

In detail, please refer to FIG. 3 and FIG. 4 together. FIG. 4 is a flow chart showing a method of determining the position of a tag using a near field communication technology according to a second embodiment. When the near field communication device is in the power saving operating mode, in the duty cycle, the control circuit 11 controls the input end of the first selection circuit 12 to electrically connect to the first coil 21 at the first time point (step S21), and in the S21, the input end of the first selection circuit 12 is not electrically connected to the third coil 23. Therefore, the first selection circuit 12 is electrically connected to the first current pin 111 and the first coil 21, and the control circuit 11 transmits the current signal (hereinafter referred to as the first current signal) by the first current pin 111 (step S22). In step S22, the control circuit 11 does not transmit the current signal by the second current pin 112. The first current signal flows through the first selection circuit 12 into the first coil 21, and the control circuit 11 determines whether the change of current value of the first current signal is greater than the preset value to determine whether the tag is close to the first coil 21 (step S23); when the control circuit 11 determines that the change of the current value of the first current signal is greater than the preset value, the control circuit 11 determines that the tag is close to the first coil 21 (the determination result is "Yes"). That is, the position of the tag is close to the first coil 21 and not close to the other coils 22, 23, and 24. Meanwhile, the near field communication device is switched from the power saving operating mode to the active mode (step S35), and the control circuit 11 communicates with the tag by the first coil 21 in the active mode.

On the other hand, when the control circuit 11 determines in step S23 that the tag is not close to the first coil 21 (the determination result is "No"), in the duty cycle, the control circuit 11 controls the input end of the first selection circuit 12 to electrically connect to the third coil 23 (step S24) at the second time point (the second time point is later than the first time point), and the input end of the first selection circuit 12 is not electrically connected to the first coil 21 in step S24. Therefore, the first selection circuit 12 is electrically connected to the first current pin 111 and the third coil 23, the control circuit 11 transmits the current signal (hereinafter referred to as the third current signal) by the first current pin 111 (step S25), and the control circuit 11 does not transmit the current signal by the second current pin 112 in step S25. The third current signal flows through the first selection circuit 12 into the third coil 23, and the control circuit 11 determines whether the change of current value of the third current signal is greater than the preset value to determine whether the tag is close to the third coil 23 (step S26); when the control circuit 11 determines that the change of the current value of the third current signal is greater than the preset value, the control circuit 11 determines that the tag is close to the third coil 23 (the determination result is "Yes"). That is, the position of the tag is close to the third coil 23 but not close to the other coils 21, 22, and 24. At this time, the near field communication device is switched from the power saving operating mode to the active mode (step S35), and the control circuit 11 communicates with the tag by the third coil 23 in the active mode.

On the other hand, when the control circuit 11 determines that the tag is not close to the third coil 23 (the determination result is "No") in step S26, in the duty cycle, the control circuit 11 controls the input end of the second selection circuit 13 to electrically connect the second coil 22 at a third time point which is later than the second time point in step S27, and the input end of the second selection circuit 13 is not electrically connected to the fourth coil 24 in step S27. Therefore, the second selection circuit 13 is electrically connected to the second current pin 112 and the second coil 22, the control circuit 11 transmits the current signal (hereinafter referred to as the second current signal) by the second current pin 112 (step S28). In step S28, the control circuit 11 does not transmit the current signal by the first current pin 111. The second current signal flows through the second selection circuit 13 into the second coil 22, and the control circuit 11 determines whether the change of current value of the second current signal is greater than the preset value to determine whether the tag is close to the second coil 22 (step S29). When the control circuit 11 determines that the change of the current value on the second current pin 112 is greater than the preset value, the control circuit 11 determines that the tag is close to the second coil 22 (the determination result is "Yes"), that is, the position of the tag is close to the second coil 22 rather than close to the other coils 21, 22, and 24. At this time, the near field communication device is switched from the power saving operating mode to the active mode (step S35), and the control circuit 11 communicates with the tag by the second coil 22 in the active mode.

On the other hand, when the control circuit 11 determines that the tag is not close to the second coil 22 (the determination result is "No") in step S29, the control circuit 11 controls the input end of the second selection circuit 13 to electrically connect to the fourth coil 24 at the fourth time point (the fourth time point is later than the third time point) in the duty cycle (step S30), and the input end of the second selection circuit 13 is not electrically connected to the second coil 22 in step S30. Thus, the second selection circuit 13 is electrically connected to the second current pin 112 and the fourth coil 24. The control circuit 11 transmits the current signal (hereinafter referred to as the fourth current signal) by the second current pin 112 (step S31), and, the control circuit 11 does not transmit the current signal by the first current pin 111 in step S31. The fourth current signal flows through the second selection circuit 13 into the fourth coil 24, and the control circuit 11 determines whether the change of current value of the fourth current signal is greater than the preset value to determine whether the tag is close to the fourth coil 24 (step S32). When the control circuit 11 determines that the current value of the fourth current signal is greater than the preset value, the control circuit 11 determines that the tag is close to the fourth coil 24 (the determination result is "Yes"), that is, the position of the tag is close to the fourth coil 24 but not close to the coil 21, 22, 23. At this time, the near field communication device is switched from the power saving operating mode to the active mode (step S35), and the control circuit 11 communicates with the tag by the fourth coil 24 in the active mode.

On the other hand, in step S29, when the control circuit 11 determines that the tag is not close to the fourth coil 24 (the determination result is "No"), the control circuit 11 determines that the tag is not close to the coils 21 to 24, that is, there is no tag close to the near field communication device. At this time, the control circuit 11 processes from step S21 to determine whether the tag is close to the near field communication device from the first coil 21 until the duty cycle ends. When the duty cycle ends, the near field communication device enters the sleep cycle. When entering a next duty cycle, the control circuit 11 is executed from step S21 to determine whether the tag is close to one of the coils 21 to 24. Based on this embodiment, as the number of the coils increases, the near field communication device determines the position of the tag is more accurately. Furthermore, under the same area of the near field communication device, the field communication device with a larger number of the coils has a larger sensing area, thereby improving the accuracy of sensing.

In one embodiment, the current pins 111, 112 and the control pins 113, 114 are general purpose input/output (GPIO) pins. The selection circuit 12/13 are a single-pole three-throw (SP3T) switch, and the control signal S1/S2 received by the selection circuit 12/13 is a three-digit digital signal. Taking binary notation as an example, in step S21, the control circuit 11 generates the control signal S1 as "001" and the control signal S2 as an arbitrary value; in step S24, the control circuit 11 generates the control signal S1 as "011" and the control signal S2 as an arbitrary value; in step S27, the control circuit 11 generates the control signal S1 as an arbitrary value and the control signal S2 as "010"; and in step S30, the control circuit 11 generates the control signal S1 as an arbitrary value and the control signal S2 as "100".

Based on the above, when the control circuit 11 determines that the change of the current value of the current signal is greater than the preset value, the control circuit 11 analyzes the digital values of the control signals S1 and S2 to determine which of the coils 21 to 24 is close to the tag. In an embodiment, when the first selection circuit 12 is electrically connected to the third coil 23 and the control circuit 11 determines that the current value of the third current signal is greater than the preset value, the control circuit 11 determines that the position of the tag is close to the third coil 23 according to the control signal S1 which is "011"; when the second selection circuit 13 is electrically connected to the second coil 22 and the control circuit 11 determines that the current value of the second current signal is greater than the preset value, the control circuit 11 determines that the position of the tag is close to the second coil 22 according to the control signal S2 which is "010", and so on.

Figure 5:
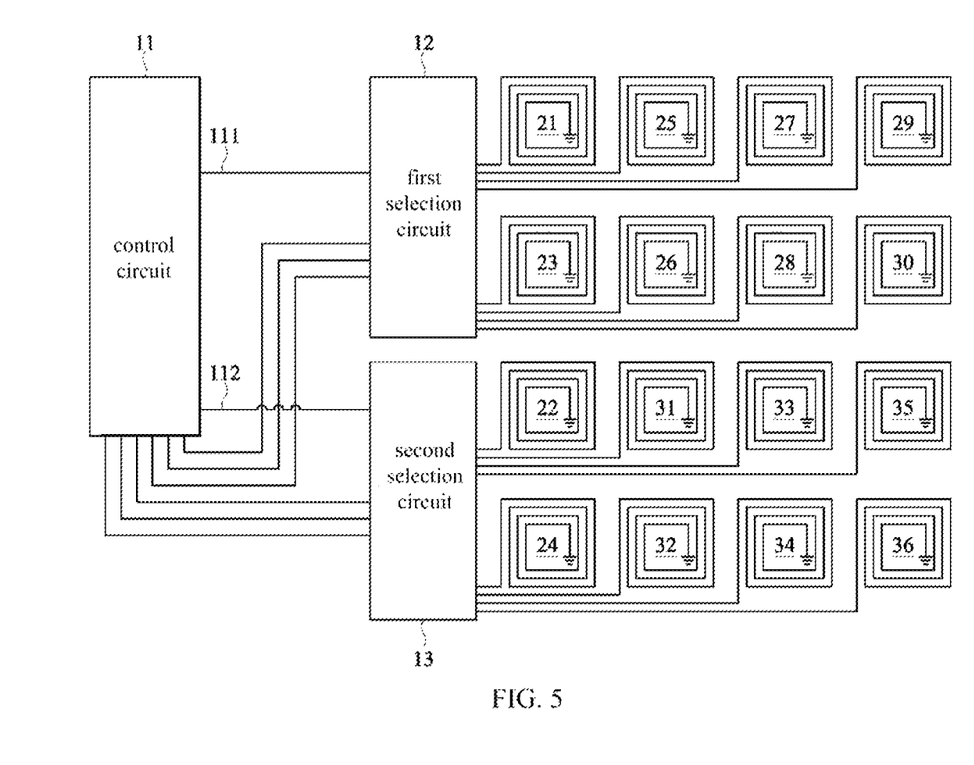
FIG. 5 is a schematic diagram showing the near field communication device according to a third embodiment.

Please refer to FIG. 5. FIG. 5 is a schematic diagram showing the near field communication device according to a third embodiment. The near field communication device includes sixteen coils 21-36, the selection circuit 12 or 13 is a single pole eight throw (SP8T) switch or a single pole nine throw (SP9T) switch. The control circuit 11 sequentially determines whether the tag is close to one of the coils 21-36 in the duty cycle, that is, the control circuit 11 determines which one of the coils 21-36 is close to the tag. Based on this embodiment, as the number of the coils increases, the near field communication device determines the tag position more accurately. Moreover, under the same area of the near field communication device, the field communication device with a larger number of the coil has a larger sensing area, thereby improving the accuracy of sensing.

In summary, according to one embodiment of the near field communication device and the tag position determination method, a plurality of coils are used to detect the tag. Compared with the near field communication device using a single coil, the sensing area of the near field communication device are increased to further improve the accuracy and precision of the tag position detection. Furthermore, the near field communication device does not require additional infrared or other positioning technology to detect the location of the tag, achieving the advantage of saving design costs.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A near field communication device, comprising:
   a first coil, one end of the first coil is directly coupled to a first grounding end;
   a second coil, one end of the second coil is directly coupled to a second grounding end; and
   a control circuit, comprising:
   a first current pin, coupled to the other end of the first coil; and
   a second current pin, coupled to the other end of the second coil;
   wherein, the control circuit transmits a first current signal to the first coil by the first current pin, and transmits a second current signal to the second coil by the second current pin, the control circuit analyzes the change of the first current signal and the change of the second current signal to determine whether the position of a tag is close to the first coil or close to the second coil, wherein the near field communication device has a power saving operating mode, the power saving operating mode includes a duty cycle and a sleep cycle, the near field communication device enters the sleep cycle to stop determining the position of the tag when the duty cycle ends, the near field communication device enters the duty cycle to continue to determine the position of the tag when the sleep cycle ends, wherein the sleep cycle is larger than the duty cycle.

2. The near field communication device according to claim 1, wherein in the duty cycle of the power saving operating mode, the control circuit transmits the first current signal by the first current pin at a first time point and determines whether the position of the tag is close to the first coil, and the control circuit transmits the second current signal by the second current pin at a second time point later than the first time point and determines whether the position of the tag is close to the second coil.

3. A near field communication device, comprising:
a plurality of first coils, one end of each of the first coils is directly couple to the grounding end;
a plurality of second coils, one end of each of the second coils is directly couple to the grounding end;
a first selection circuit, coupled to the other end of each of the first coils;
a second selection circuit, coupled to the other end of each of the second coils; and a control circuit, comprising: a first current pin, coupled to the first selection circuit;
a second current pin, coupled to the second selection circuit;
a first control pin, coupled to the first selection circuit; and
a second control pin, coupled to the second selection circuit;
wherein, the control circuit controls the first selection circuit to electrically connect with the first coils respectively, and transmits a first current signal to one of the first coils by the first current pin and the first selection circuit, the control circuit controls the second selection circuit to electrically connect with the second coils respectively, and transmits a second current signal to one of the second coils via the second current pin and the second selection circuit, and the control circuit analyzes change of the first current signal and change of the second current signal to determine whether the position of a tag is close to one of the first coils or close to one of the second coils, wherein the control circuit controls the first selection circuit to sequentially connect with each first coil by the first control pin, and controls the second selection circuit to sequentially connect with each second coil electrically with the second control pin.

4. The near field communication device according to claim 3, wherein the near field communication device includes a power saving operating mode, in a duty cycle in the power saving operating mode, the control circuit controls the first selection circuit to electrically connect with each of the first coils in sequence, and transmits the first current signal by the first current pin when the first selection circuit is electrically connected to one of the first coils, the control circuit controls the second selection circuit to electrically connect with each of the second coils in sequence, and transmits the second current signal by the second current pin when the second selection circuit is electrically connected to one of the second coils, and the control circuit analyzes the changes of the first current signal and the changes of the second current signal to determine the tag is close to the first coil or the second coil.

5. The near field communication device according to claim 4, wherein the control circuit determines whether the change of current value of the first current signal is greater than the preset value after transmitting the first current signal, to determine which one of the first coils is close to the tag, and the control circuit determines whether the change of current value of the second current signal is greater than the preset value after transmitting the second current signal to determine which one of the second coils is close to the tag.

6. The near field communication device according to claim 4, wherein the near field communication device further includes an active mode, when the control circuit determines that the tag is close to the first coil or the second coil, the near field communication device switches from the power saving operating mode to the active mode, and the control circuit communicates with the tag in the active mode via the first coil or the second coil which is close to the tag.

7. A method of determining the position of a tag, comprising following steps:
controlling a first selection circuit to sequentially connect with a first coil and a third coil by a first control pin of a control circuit, wherein the first control pin is coupled to the first selection circuit;
transmitting a first current signal to the first coil by a first current pin of the control circuit at a first time point, wherein one end of the first coil is directly coupled to a first grounding end;
analyzing the change of the first current signal to determine whether the position of a tag is close to the first coil by the control circuit;
controlling a second selection circuit to sequentially connect with a second coil and a fourth coil by a second control pin of the control circuit, wherein the second control pin is coupled to the second selection circuit
transmitting a second current signal to the second coil by a second current pin of the control circuit at a second time point, one end of the second coil is directly coupled to a second grounding end; and
analyzing the change of the second current signal to determine whether the position of the tag is close to the second coil by the control circuit.

8. The method of determining the position of a tag according to claim 7, wherein the step of transmitting the first current signal to the first coil by a first current pin of the control circuit at a first time point comprises:
controlling the first selection circuit electrically connected to the first coil by the control circuit at the first time point in a duty cycle of a power saving operating mode; and
transmitting the first current signal by the first current pin of the control circuit when the first selection circuit is electrically connected to the first coil;
wherein, the step of transmitting the second current signal to the second coil by the control circuit comprises:
controlling the second selection circuit electrically connected to the second coil by the control circuit controlling at the second time point in the duty cycle; and
transmitting the second current signal by the second current pin of the control circuit when the second selection circuit is electrically connected to the second coil.

9. The method of determining the position of a tag according to claim 8, further comprising:
controlling the first selection circuit to electrically connect to the third coil by the control circuit at a third time point later than the first time point in the duty cycle;
transmitting a third current signal to the third coil by the first current pin of the control circuit when the first selection circuit is electrically connected to the third coil;
analyzing the change of the third current signal to determine whether the position of the tag is close to the third coil by the control circuit;
controlling the second selection circuit electrically connected to the fourth coil by the control circuit at a fourth time point later than the second time point in the duty cycle;

transmitting a fourth current signal to the fourth coil by the second current pin of the control circuit when the second selection circuit is electrically connected to the fourth coil; and analyzing the change of the fourth current signal to determine whether the position of the tag is close to the fourth coil by the control circuit.

10. The method of determining the position of a tag according to claim 9, wherein in the step of controlling the first selection circuit to electrically connect to the third coil by the control circuit, the control circuit controls the first selection circuit to electrically connect the third coil but not electrically connect the first coil;

wherein in the step of controlling the second selection circuit electrically connected to a fourth coil by the control circuit, the control circuit controls the second selection circuit to electrically connect the fourth coil but not electrically connect the second coil.

* * * * *